(12) United States Patent
Singer

(10) Patent No.: US 6,829,207 B1
(45) Date of Patent: Dec. 7, 2004

(54) METHOD FOR RECONSTRUCTION OF PHONOGRAPH RECORDS FROM PHYSICAL MEASUREMENT

(75) Inventor: Neil C. Singer, Armonk, NY (US)

(73) Assignee: Convolve, Inc., New York, NY (US)

( * ) Notice: Subject to any disclaimer, the term of this patent is extended or adjusted under 35 U.S.C. 154(b) by 304 days.

(21) Appl. No.: 09/732,598

(22) Filed: Dec. 7, 2000

Related U.S. Application Data

(60) Provisional application No. 60/169,554, filed on Dec. 8, 1999.

(51) Int. Cl.⁷ .................................................. G11B 7/28
(52) U.S. Cl. ...................... 369/53.41; 369/18; 369/107; 369/84
(58) Field of Search ................................ 369/18, 53.15, 369/53.41, 127, 17, 84, 107

(56) References Cited

U.S. PATENT DOCUMENTS

| | | | | |
|---|---|---|---|---|
| 3,992,593 A | * | 11/1976 | Heine ........................... | 369/18 |
| 4,137,430 A | | 1/1979 | Muraoka et al. ......... | 179/100.4 |
| 4,155,098 A | * | 5/1979 | Roach et al. ............ | 369/53.41 |
| 4,186,280 A | | 1/1980 | Geiseler ................... | 179/100.1 |
| 4,275,888 A | * | 6/1981 | Anderson et al. ........... | 369/247 |
| RE30,723 E | | 8/1981 | Heine .......................... | 369/18 |
| 4,363,118 A | * | 12/1982 | Roach et al. ............. | 369/53.13 |
| 4,502,135 A | * | 2/1985 | Dholakia .................... | 369/126 |
| 4,504,934 A | | 3/1985 | Tanaka et al. ................ | 369/18 |
| 4,755,979 A | | 7/1988 | Dolby .......................... | 369/43 |
| 4,870,631 A | * | 9/1989 | Stoddard ..................... | 369/18 |
| 4,972,344 A | * | 11/1990 | Stoddard et al. .............. | 369/18 |
| 5,003,522 A | * | 3/1991 | Dolby ......................... | 369/128 |
| 5,461,605 A | * | 10/1995 | Takimoto et al. ............. | 360/62 |
| 5,740,146 A | * | 4/1998 | Webster ..................... | 369/107 |

* cited by examiner

Primary Examiner—W. R. Young
Assistant Examiner—Jorge L Ortiz Criado
(74) Attorney, Agent, or Firm—Choate, Hall & Stewart

(57) ABSTRACT

A method for reconstruction the original groove configuration of a phonograph record. The methodology comprises providing an instrument for making measurements of the geometry of a groove of a phonograph record with the instrument in communication with a computer and the computer executing a reconstructive analysis code thereby reconstruct the groove geometry of the phonograph record using data obtained from the measurements of the geometry of the groove.

16 Claims, 3 Drawing Sheets

METHOD FOR RECONSTRUCTION OF PHONOGRAPH RECORDS FROM PHYSICAL MEASUREMENT

This application claims priority to provisional application Ser. No. 60/169,554 filed on Dec. 8, 1999, the contents of which are hereby incorporated by reference.

FIELD OF THE INVENTION

The present invention relates generally to a method for reconstructing the original information (i.e., sound recordings) encoded upon a phonograph record despite wear or damage to the record. The invention recognizes that most or all of the original information may be retrievable, despite the inability of a typical stylus to properly track a worn or damaged groove of the record. The invention has potential application in the fields of sound recording and record reconstruction.

BACKGROUND OF THE INVENTION

In the sound recording industry, there is substantial interest in restoring old recordings of vocal performances as well as instrumental and orchestral recordings.

One approach to improving the acoustic quality of old sound recordings, as described in U.S. Pat. No. 4,186,280, involves selective amplification or filtration of the acoustic signal mixture, in accordance with the frequency ranges corresponding to the identified sound sources or parts (solo voices, solo instrument, predominant instrumental group and the like) on the record. But suppression or amplification of certain frequencies does not accurately reproduce the original sound.

The motion of a cutting tool 10 in a plastic media encodes sound on phonograph records, as shown in FIG. 1. In mono recordings the cutting tool 10 is moved back and forth in one direction. For stereo recordings, the cutting tool is moved in two orthogonal directions, encoding two channels of stereo signal in the velocity of two orthogonal groove walls (6 and 8 as shown in FIG. 1). The two walls (6 and 8) form a "V" groove in the record with each wall forming an angle of approximately 45 degrees with the plane of the record. After a master is cut, multiple copies are made using industry standard pressing techniques.

Standard techniques for playback of records involve measuring the rate of change of the groove position (its "velocity"), typically by a stylus 4 (shown in FIG. 2) which rides in the groove 2 of the record (either the copy or the original cut master). When a record is damaged due to wear, dirt or mishandling, a groove wall 8 may be damaged (exemplified by FIG. 2) so that the playback stylus 4 cannot move in the same manner as was originally encoded on the record. In any system, velocity measurements are quite noisy when small position errors are introduced. In other words, small positional deviations (caused by imperfections or damage) result in large instantaneous velocities. This is a reason why a record degrades so noticeably when it is worn. Small imperfections in the groove are amplified in the velocity signal produced by the stylus. These small positional defects cause sound degradation and often "clicks" or "pops".

Conventionally, record companies attempting to reconstruct old recordings will play a record using different size styli in an effort to read different parts of the groove and interleave the different "plays" of the record. By choosing different size styli, the groove is being tracked at different heights. The goal is to find a location in the groove that is relatively pristine. However, this method has drawbacks because the damage to the groove is often excessive and varies significantly at different locations.

Thus, there continues to be a need to reconstruct sound recordings from a worn or damaged record by means of a method which is true to the originally intended sound recording, whereby damage throughout the record does not create significant unintended noise.

SUMMARY OF THE INVENTION

The invention disclosed herein is a method for reconstructing an original groove configuration of a phonograph record. The steps of the method include providing an instrument for making a measurement of an entire groove of a phonograph record, wherein the instrument is in communication with a computer executing reconstructive analysis code. Then the instrument is used to make a measurement of a groove of the phonograph record, and communicating the measurement to the computer and executing the reconstructive analysis code, thereby reconstructing the original groove configuration.

In one embodiment the groove geometry is determined by taking measurements of one or more undamaged portions of the record (the computer may piece these together). Next, the measurements may comprise incremental cross sectional measurements of the groove, which are analyzed by the computer to reconstruct an original cutting tool path, based on the expected groove geometry determined on the first step.

The measurements may be made optically or mechanically. Mechanical measuring instruments may also employ air (fluid) bearing styli, and could comprise a Coordinate Measuring Machine (CMM), scanning electron microscope, a stylus and interferometer apparatus, and/or multiple-probe instruments. An embodiment could also include a flexible stylus for measuring an entire groove cross section simultaneously. Measuring the record at a rate slower than conventional playback allows for use of an instrument with a narrower dynamic range than conventional styli.

In another embodiment, the invention could additionally be used in real time audio playback based upon the reconstructed original record groove configuration.

DETAILED DESCRIPTION

Preferred embodiments of the invention will now be described with reference to the accompanying drawings.

Figure 1:
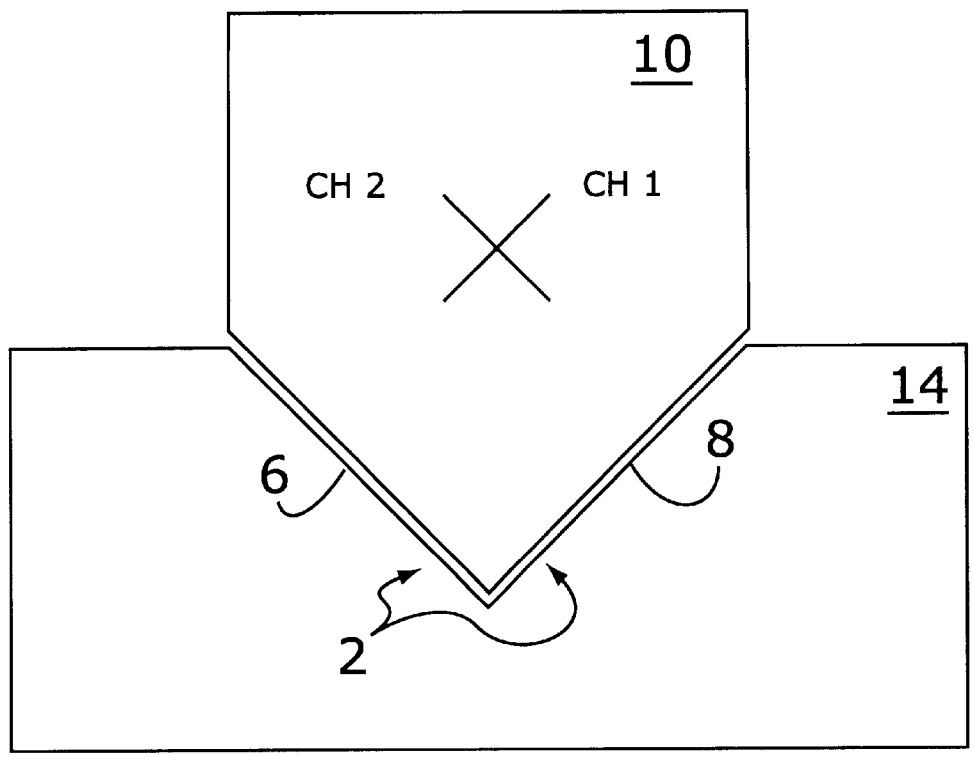
FIG. 1 is a schematic diagram illustrating a tool cutting a groove in a record.

By measuring a geometry of a record groove (shown as 2 in FIG. 1 and FIG. 2), an original sound can be reconstructed in high fidelity.

Figure 2:
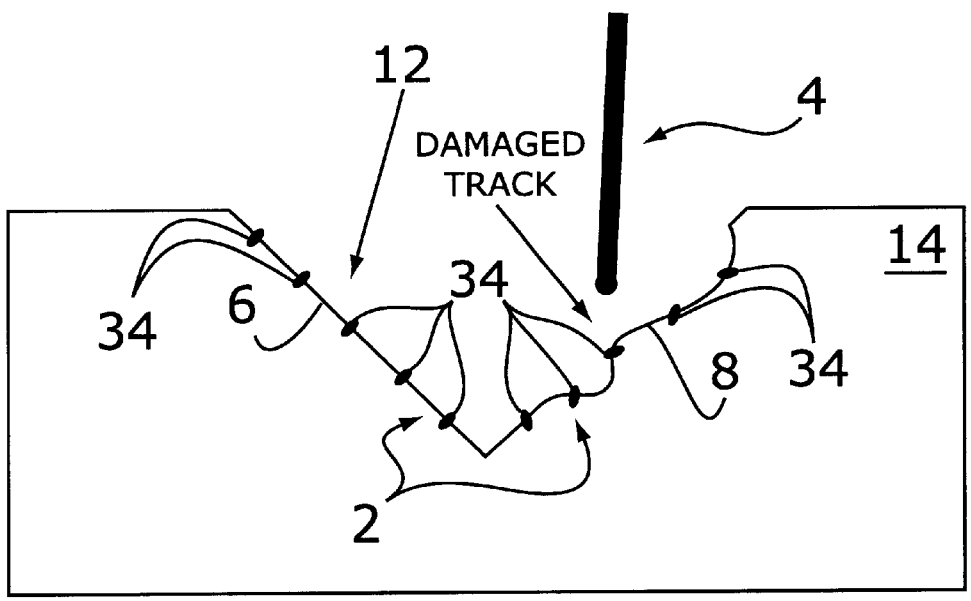
FIG. 2 is a schematic diagram illustrating a damaged groove of a record.
Figure 3:
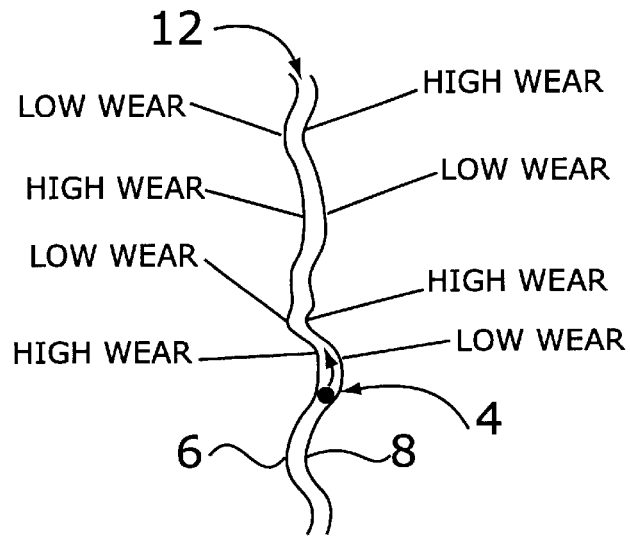
FIG. 3 is a schematic diagram illustrating a groove path and points of high and low wear.

FIG. 2 shows a damaged wall 8 of a groove 2. Note that a playback stylus 4 can never track a groove wall 8 that has been damaged this much. When records wear, they do not do so uniformly. As shown in FIG. 3, if a stylus 4 tracks a groove path 12 which bends to the right, forces from the left wall 6 must push the stylus 4 over to keep it tracking the groove path 12. This results in high wear and signal loss. It is important to note that the signal loss is irrecoverable from the damaged portion of the left wall 6. Even if the left wall 6 of the groove 2 is permanently destroyed, all of the sound information is still intact in the right wall 8 of the groove 2. In conventional playback, the stylus 4 can never retrieve this information because it is unable to track the right wall 8.

Figure 4:
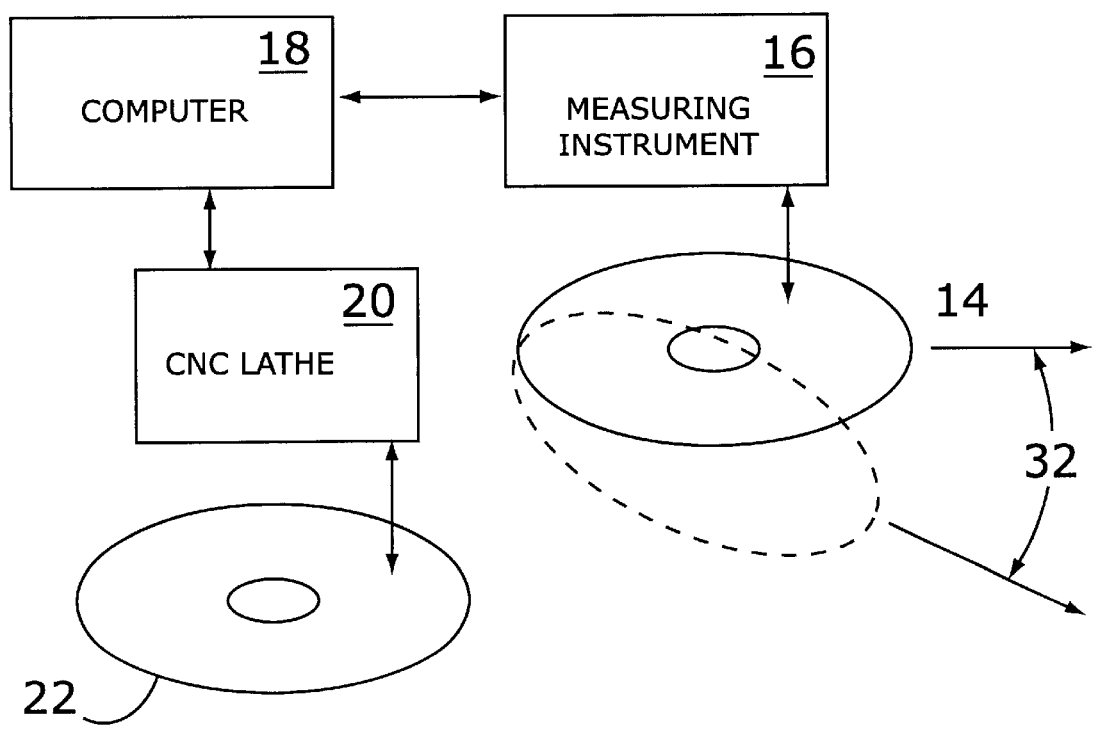
FIG. 4 is a block diagram illustrating an embodiment of the invention.

However, the groove path 12 originally cut by a cutting tool 10 may be determined by studying incrementally the geometry of cross sections of the groove 2. The applicant has invented a method whereby the original sound encoded on a phonograph record 14 (as shown in FIG. 4) is reconstructed through measurements of the shape of the groove 2 of the record. These measurements may be made by an instrument 16 mechanically, optically, or otherwise.

If the entire groove 2 is measured, the original cutting tool path 12 can be readily determined in the record 14, and a computer model of the original (fully reconstructed) groove 2 can be made from the portions of the groove 2 that are undamaged. Unless the groove is totally obliterated in sections, the original recording is completely recoverable. Only a small (even miniscule) portion of each wall (6 and 8) must be intact for a successful measurement. For portions of the groove 2 where little information remains, secondary information may be used to reconstruct the tool path. For example, a trajectory of the cutting tool 10 may be interpolated from positional measurements made the moment before and after the position of interest, thereby producing stable data for the position of interest. Additionally, the cutting tool 10 may have left microscopic signature marks and/or defects as it cut its path 12. These signature marks and/or defects may be tracked positionally along the groove 2, providing information about sections of the groove 2 which are otherwise unreadable. Since the tool path 12 will be reconstructed "offline", measuring information from the groove does not need to be performed uniformly. More measurements may be made on either circumferential side of a excessively damaged portion of the groove 12, or alternatively more measurements may be made in the damaged portion. Measurements of cross sectional slices of the groove 12 do not have to be made in equal spatial or temporal increments.

In a preferred embodiment, the shape of the groove 2 is determined from an undamaged section of the record 14 by piecing together undamaged portions of the record 14. The groove 2 of the record 14 is then measured and a positional map of the groove is generated by an instrument 16. A computer 18 in communication with the instrument 16 then examines each cross sectional measurement of the groove 2 and determines the necessary tool path 12 at each instant.

Once the tool path 12 has been generated, a sound waveform may be produced by the computer 18 from the reconfigured model of the original tool path 12. The sound waveform may be directly played, or recorded in another media, such as on a compact disc or, referring to FIG. 4, on another record 22 by means of a phonograph lathe 20. In this sense the invention may be considered a "virtual" stylus that finds undamaged sections of the groove at every instant. Provided some portion of the original groove is present (or can be inferred), the original sound is completely recoverable by "virtual playback", i.e., simulating a mechanical playback by running the virtual stylus through the reconstructed model of the original groove configuration.

Resolving Along the Groove Circumferentially

Figure 5:
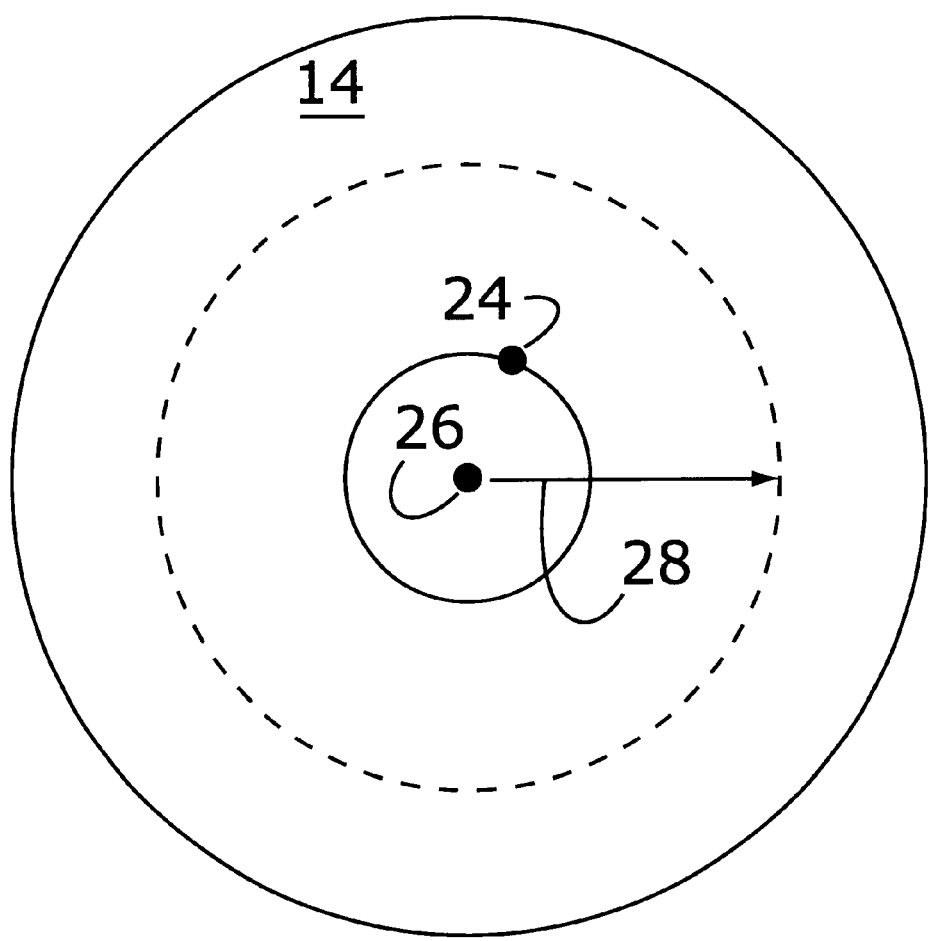
FIG. 5 is a schematic diagram illustrating a record and grooves on the record.

The highest resolution along groove 2 is required where the stylus 4 moves the slowest. Referring to FIG. 5, this occurs at a point 24 of the groove 2 closest to the center 26 of the record 14. Assuming a 6 inch diameter at this point 24, the groove circumference is given by $\pi*D$, where D is the diameter of the (approximate) circle, or 3.14*(6 in)=18.8 inches.

Using the calculations above, if the circumference of the groove 2 nearest to the center 26 of the record 14 is approximately 19 inches, and 33 grooves are required to produce a minute of sound at 33⅓ RPM, approximately 627 inches of groove 2 must be mapped to produce a minute of sound at the point 24. This translates to 10.5 inches per second. To obtain a 100 KHz sampling rate (a standard CD employs 44 KHz sampling), 100,000 samples must be taken across 10.5 inches of groove 2. This translates into 0.1 mils/sample or 2.54 microns/sample. Thus, the groove 2 must be sampled in increments of 0.1 mils along the groove 2 circumferentially.

Resolving the Groove Cross Sectionally

The resolution across a cross section of the groove 2 would have to be determined experimentally. At least a few data points 34 would be required. In one embodiment, illustrated in FIG. 2, ten data points 34 may be taken across a cross section of the groove (more of less may be taken). Assuming the groove measures two mils across (50 microns), the resolution required would be 5 microns.

Data Points Required for the Measurement

An estimate may be made of the number of data points 34 and the resolution required to make a successful mapping of the phonograph record 14. Assuming an average diameter 28 of the record 14 is 9 inches, an average circumference 30 is given by $\pi D$, where D is an average diameter 28. Thus, the average circumference is $\pi D=(9 \text{ in})*3.14=28.3$ inches. Furthermore, a total number of inches requiring mapping may be calculated (approximately) by multiplying a record rotational rate of 33⅓ RPM by the calculated average circumference and by the number of minutes of sound on one side of the record (22 minutes) to obtain (28.3 in)*(33⅓ RPM)*(22 min of sound/record side), or almost 21,000 inches to be mapped. At 0.1 mil sample size, approximately 210,000,000 cross sectional samples will be required along the entire length of the groove 2. If each cross sectional sample is comprised of 10 individual data points, 2.1 billion data points will be available for reconstructing a model of the groove.

The step of measuring the groove can be accomplished by an optical and/or mechanical instrument 16. Several optical instruments are currently available for capturing an image of an area of a surface and constructing an accurate map of the surface. One such instrument is the NewView 5000 product manufactured by Zygo Corporation. This product is a scanning white light interferometer (SWLI). Using a 100× magnification lens (chosen so that the surface could be measured at up to a 45 degree angle), a field of view is 70 microns by 50 microns and the spatial resolution of the measurement is 0.22 microns. While in principle, it has the accuracy to make the measurements required to fully map the groove 2 in a phonograph record 14, it is not the preferred method because its measurement time is too slow. Each field of view takes 4 to 10 seconds to process. Using the results calculated above, 627 inches (one minute of sound) could be scanned in 70 micron (2.8 mil) increments. This translates into 224,000 required scans at 5 seconds per scan, or 311 hours to recover 1 minute of sound. Far more information would be acquired using this technique than what is needed to recover the sound. The SWLI would map the entire surface at 0.22 micron spatial resolution, while only information related to the groove is required and furthermore it is only needed in 2.54 micron intervals (and even less resolution further from the hub), roughly one order of magnitude less than the SWLI's capability. The existence of this instrument proves that it is possible to make the measurement. However, a faster specialized instrument 16 could be successfully designed and built. To this end, specialized tooling for the SWLI would significantly speed up the measurement. For example, by appropriately positioning the record 14 at an angle 32 relative to the SWLI, as shown in FIG. 4, the 45-degree limitation may be removed, so a much larger field of view could be used (by over a factor of 10). However, only one wall (6 or 8) of the groove 2 could be measured at a time using this technique.

In a preferred embodiment, a mechanical instrument 16 specially designed to track along the groove 2 with one or more styli will be employed. However, a commercially available CMM (or even a scanning electron microscope) may be used to measure the geometry of the groove 2. A CMM uses a pointer to touch the surface of an object (in this case, the phonograph album's groove). The pointer is moved to various locations and the position of the pointer is recorded. By touching the groove at different locations across the groove (corresponding to the same instant in time) and next advancing to a new location along the groove (corresponding to later in time) a cross sectional map of the groove can be constructed.

In another embodiment, a tiny stylus that is guided along the groove path 12 and measured with an interferometer may be used. The instantaneous position of the stylus is recorded and it is advanced. The groove may be re-measured with the stylus repositioned at a different height. This can be repeated several times until a "map" of the groove is created. This would have the effect of creating a contour map of the groove not unlike those produced by geographers in creating a contour map of a valley. A horizontal coordinate is measured for each chosen vertical height, then this step is repeated for both walls of the groove 2.

In another embodiment, a multiple-point instrument 16 equipped with multiple measuring probes movable along the groove 2 may be employed. This instrument 16 may have a comb-like configuration of measuring probes. The measuring probes may additionally be arranged in a parallel configuration across a cross section of the groove 2 perpendicular to the plane of the record 14, or may be arranged in a spatially staggered configuration.

Any of these mechanical embodiments may additionally employ an air-bearing (or fluid bearing) stylus instead of a mechanical pointer. This would have the added benefit of avoiding contact with the phonograph album, and thereby reducing wear.

Considerable time savings may be achieved by recognizing that the entire surface of the record need not be scanned. If the groove 2 is tracked, the measurements (either mechanical or optical) can be directed only at the area of interest (the groove itself).

A significant advantage of the present invention is that because the record 14 will most likely be measured at a speed slower than real time playback, the measuring instrument 16 will not require as large a dynamic range as that of a playback stylus 4.

The techniques embodied in this invention will most likely be used "offline" to reconstruct audio signals in an effort to reconstruct a superior master. However, the techniques could be applied, in another embodiment, to real time playback of a phonograph record 14. By taking multiple simultaneous measurements of the groove 2 during playback, redundant information is recorded. Theoretically, all of the measurements taken at different positions within an undamaged groove should produce the same audio signal. A perfect (or nearly perfect) playback can be achieved by polling the signals and determining which individual ones or some combination are most likely to be correct at any instant.

For example, assume that five simultaneous (or slightly staggered) measurements are taken at different locations along the cross section the groove 2. If at some instant, three of the signals are substantially identical, then an average of those three may be used for the playback and the other two are discarded. In another embodiment, all measurements might be processed together to form an aggregate signal. In yet another embodiment, statistical analysis may be used to predict the most likely original source given the multiple sensor readings. This analytical technique is used in other fields, such as in Partial Response Maximum Likelihood (PRML) technology for recovering the feedback signal on a computer disk drive from multiple low level signals from different channels.

Another embodiment envisions taking measurements employing a flexible stylus that measures the entire cross section of the groove 2 as it travels circumferentially along the groove 2. Such a stylus should be configured with flexible wall-contacting sides. Signals from either or both sides could be chosen for reconstructing the original sound recording.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. Method for reconstruction of a groove configuration of a photograph record, comprising the steps of:
   providing an instrument for making a measurement of the geometry of a groove of a phonograph record, the instrument in communication with a computer executing reconstructive analysis code;
   making a measurement of the groove of the photograph record by means of the instrument;
   communicating the measurement between the instrument and the computer executing reconstructive analysis code; and
   executing the reconstructive analysis code thereby reconstructing a groove geometry of the photograph record.

2. The method of claim 1, wherein the measurements are positional measurements.

3. The method of claim 1, whereby making the measurement further comprises making multiple measurements before and after an excessively damaged portion of the groove for interpolating.

4. The method of claim 1, whereby the reconstructive analysis code pieces together measurements made of one or more portions of the record.

5. The method of claim 1, whereby making the measurement comprises incrementally making cross sectional measurements of the groove.

6. The method of claim 5, whereby the reconstructive analysis code examines each cross sectional measurement of the groove to determine an original cutting tool path.

7. The method of claim 1, whereby the instrument makes the measurement optically.

8. The method of claim 1, whereby the instrument makes the measurement mechanically.

9. The method of claim 8, wherein the instrument employs a fluid-bearing stylus.

10. The method of claim 1, wherein the instrument comprises a coordinate measuring machine or scanning electron microscope.

11. The method of claim 1, wherein the instrument comprises a stylus and positional measurement means.

12. The method of claim 1, wherein the instrument comprises a multiple-probe instrument.

13. The method of claim 1, further comprising the step of playing back in real time an audio recording based on the reconstructed original groove configuration.

14. The method of claim 1, wherein the instrument employs a flexible stylus for measuring an entire groove cross section instantaneously.

15. The method of claim 1, further comprising the steps of making multiple measurements and applying analytical technique to determine which measurement to communicate to the computer.

16. Method for virtual playback of a phonograph record, comprising the steps of:

providing an instrument for making a measurement of the geometry of a groove of a phonograph record, the instrument in communication with a computer executing reconstructive analysis code, the computer having means to produce sound waveform;

making a measurement of the geometry of the groove of the phonograph record by means of the instrument;

communicating the measurement between the instrument and the computer executing reconstructive analysis code;

executing the reconstructive analysis code, thereby creating a computer model of the groove geometry; and generating sound based upon the computer model of the groove geometry.

* * * * *